United States Patent [19]
Gelardi et al.

[11] Patent Number: 5,334,254
[45] Date of Patent: Aug. 2, 1994

[54] NON-ABRASIVE DISC CLEANER

[75] Inventors: Paul J. Gelardi, P.O. Box 127, Cape Porpoise, Me. 04014; John A. Gelardi, Kennebunkport; David A. Capotosto, Kennebunk, both of Me.

[73] Assignee: Paul J. Gelardi, Kennebunkport, Me.

[21] Appl. No.: 964,001

[22] Filed: Oct. 21, 1992

[51] Int. Cl.$^5$ .................................................. B08B 3/04
[52] U.S. Cl. ....................................... 134/25.4; 134/33; 134/157; 134/162; 134/902; 369/72
[58] Field of Search .............. 15/210 R, 97.1, 230, 15/256.52; 360/137; 369/72; 134/113, 121, 25.4, 111, 149, 153, 154, 157, 162, 100.1, 100.2, 902, 33

[56] References Cited

U.S. PATENT DOCUMENTS

| | | | |
|---|---|---|---|
| 3,483,049 | 12/1969 | Grubbe | 134/102.1 |
| 4,107,810 | 8/1978 | Varni et al. | |
| 4,161,356 | 1/1979 | Griffin et al. | 134/902 X |
| 4,188,106 | 2/1980 | Harvey | 134/121 |
| 4,498,114 | 2/1985 | David | |
| 4,544,446 | 10/1985 | Cady | 134/902 |
| 4,569,098 | 2/1986 | Kawabe | 369/72 |
| 4,639,813 | 1/1987 | Uno | |
| 4,654,917 | 4/1987 | Yeung | |
| 4,825,497 | 5/1989 | Nagao et al. | |
| 5,126,992 | 6/1992 | Lavinski et al. | 369/72 X |
| 5,169,887 | 12/1992 | Thompson et al. | 134/902 X |

FOREIGN PATENT DOCUMENTS

| | | | |
|---|---|---|---|
| 100701 | 8/1979 | Japan | |
| 1-304732 | 12/1989 | Japan | 134/902 |

OTHER PUBLICATIONS

CD HydroBath Instruction Manual.

*Primary Examiner*—Frankie L. Stinson
*Attorney, Agent, or Firm*—James Creighton Wray

[57] ABSTRACT

A non-abrasive disc cleaner is disclosed. The present cleaner incorporates a base, a cover, a cleaning solution reservoir, a spin pan and a spinner means with a drive spindle for spinning the disc within the spin pan. Solution is supplied to the spin pan from the reservoir. A spinner is mounted within the cleaner, and the spin pan is horizontally positioned within the base above the reservoir. The disc is positioned with respect to the fluid within the pan with the spinning motion of the CD creating froth which forms a high surface area, thin skin of bubbles on the CD. Because of the spinning motion, the bubbles move outwardly and the CD is dried by air contact. Spinning the disc rapidly above the surface of the fluid causes a vacuum to draw the fluid upwards for frothing, or spinning the disc within the fluid froths the cleaning fluid and centrifugally removed the fluid from the pan.

31 Claims, 2 Drawing Sheets

NON-ABRASIVE DISC CLEANER

BACKGROUND OF THE INVENTION

The present invention relates to cleaners for discs, specifically audio discs such as compact discs and records.

Previous disc cleaners incorporate brushes or pads which mechanically or manually rub the surface of the disc to remove particulate matter on the surface of the disc. This often results in abrading or scratching of the surface of the disc. Further, fingerprints, dried liquids and other such contaminants are not sufficiently removed. There is a need for a disc cleaner which does not abrade the surface of a disc, yet which effectively removes particulate matter and other contaminants.

SUMMARY OF THE INVENTION

The present invention provides a non-abrasive disc cleaner, specifically a compact disc cleaner, which thoroughly removes all contaminants from the disc without damaging the quality of the disc.

In a preferred embodiment, the cleaner incorporates an encasement, a reservoir, a spin pan, and a spinning or turning means for spinning the disc within the spin pan. The spinning means is preferably a motor, which can be electrical, hand cranking, gear arrangements or similar motors. The motor, in a preferred embodiment, is provided within the cover with a center hole engagement means extending downward toward the base. A power supply such as an outlet cord or a battery pack is provided for powering the motor. Alternatively, the motor may be positioned in the base for central engagement or mounted for edge engagement.

For cleaning a CD, a given amount of solution is drawn onto the spin pan, either through the spinning action of the CD or through a pump. A port can be provided on the spin pan for communication with the reservoir, wherein the solution is pumped through the port and onto the pan. The port can be positioned centrally and provided with a circular raised pan opening so that solution is pumped onto the pan but does not re-enter the port. The user positions the CD within the spin pan and spins the disc to froth the liquid, forming bubbles which clean the disc as they move centrifugally off the disk.

Another preferred embodiment provides spinning of the CD in a horizontal position above the fluid level within the spin pan. High RPMs imparted on the disc cause a partial vacuum underneath which draws the fluid upward into contact with the disc. Continued high RPM spinning froths the liquid, spinning the disc through the foam and thoroughly cleaning the disc with no abrasive contact. Lowering of the RPMs allows the fluid to return to its original position and dries the disc through centrifugal force and air contact.

A motor may spin the disc. Starting the motor may be automatic with closure of the cover, or a switch can be provided for selectively turning the motor on. Initial spinning action of the CD within the cleaning solution in the pan causes the solution to froth into thin film bubbles with a high surface area per liquid volume, which washes the CD. The disc easily spins through the froth and the bubbles clean the disc without drag or abrasion. Slower spinning allows the pressure to increase between the disc and the liquid, allowing the liquid to drop. The spinning breaks the bubbles and flings the bubbles and thin film liquid outward. Continued spinning causes the solution to fly off the disc until the CD is essentially dry. A splash guard is preferably provided along the exterior of the pan for catching and directing the solution into the reservoir. A filter can be provided for filtering solution before entering the reservoir.

A preferred motor is a variable speed motor. Different preset cycles automatically or manually selectively vary the amount of cleaning to be done.

In one setting, there is a delay before starting of the motor so that the CD is soaked in the fluid in the pan. In one embodiment, the washing cycle would require a slower spinning speed than the drying. Therefore, the motor, after a given time, would change from a wash cycle at a lower speed to a dry cycle at a faster speed. A reverse mode can be incorporated into the motor for reversing the spin of the CD during or after the cleaning cycle. Reversing the direction of the CD can add to the movement of the fluid and cleaning of the disc, release the vacuum underneath the spinning disc, and/or assist in drying of the disc.

In a simple procedure for cleaning a disc, the user would place the disc on a drive engagement means or drive spindle, close the cover and push the start button. The disc spins in or above the solution, first frothing the solution to wash away contaminants. Continued spinning of the disc lifts and spins the fluid out of the pan and off the disc onto the splash guard. When the pan is empty, air contact and centrifugal force dries the surface of the disc. The user then opens the non-abrasive disc cleaner and removes the ready-to-play disc.

The fluid can be moved from the reservoir to the pan by use of a motor pump. Alternatively, the spinning action of the disc in the pan can create a vacuum which pulls fluid onto the pan from the reservoir.

Windows can be provided in the cover or as the splash guard to permit interior viewing. An exterior section of the cleaner may have an insertable holding means for holding a bottle or vial of concentrated solution for mixing with water in the reservoir.

A rubber gasket can be provided between the cover and the base to hinder spilling of solution during the wash cycle. Various hinge arrangements can be provided between the cover and the base, and a biasing means can be provided for forcing the cover into an open position when the wash cycle is over. The filters are preferably removable and reusable for cleaning. Alternatively, throw-away cloth or paper filters are provided.

These and further and other objects and features of the invention are apparent in the disclosure, which includes the above and ongoing written specification, with the claims and the drawings.

DETAILED DESCRIPTION OF THE DRAWINGS

Figure 1:
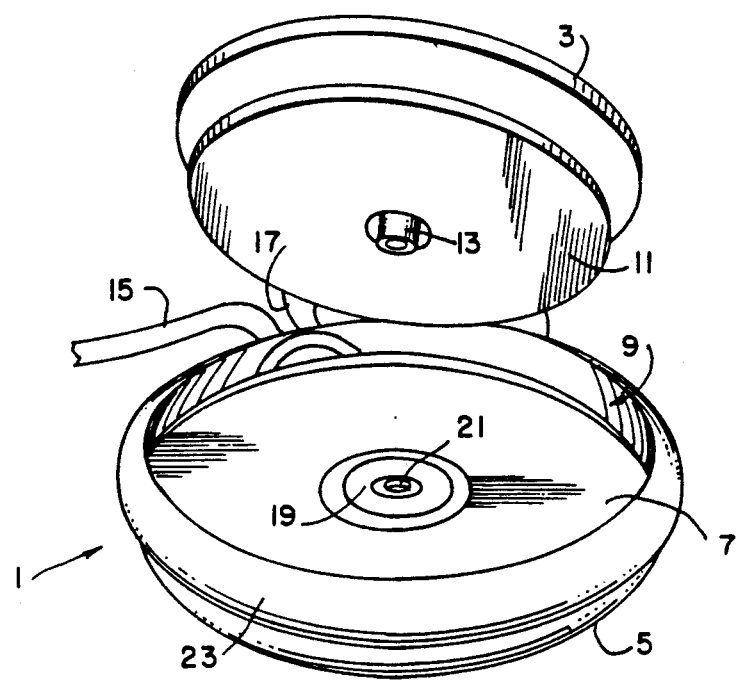
FIG. 1 is a perspective elevation showing the cleaner with the lid opened and the CD attached to the drive spindle.

A preferred non-abrasive CD cleaner generally indicated by the numeral 1 in FIG. 1 incorporates a cover 3 joined to a base 5 by a hinge 17. The base incorporates a spin pan 7 overlying a reservoir 9. The pan 7 preferably lies approximately in a horizontal plane. The cover 3 incorporates a motor (not shown) having a drive spindle or CD engagement means 13 for engaging a CD 11. The motor incorporates a power supply 15, in this case a cord, for spinning the disc through the drive spindle 13. As the cover 3 is lowered, the disc 11 nests in or above the pan 7. The fluid or solution reservoir 9 supplies the pan 7 with solution through a port 21. A pump (not shown) can be the supplying means or the spinning action of the disc may create a vacuum which draws fluid through the port 21 and onto the pan. A center well 19 may be provided to hinder return of the fluid to the reservoir by way of the port.

Figure 2:
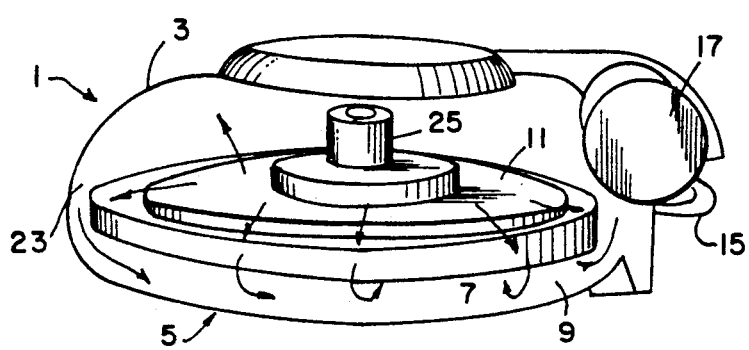
FIG. 2 is a cutaway view showing the spinning action of the CD imparted through the motor and recycling of the fluid as it spins off the CD and out of the pan.

A splash guard 23 preferably lies about the circumference of the pan 7 so as to catch fluid flying off the spinning disc and direct it back into the reservoir 9, as shown in FIG. 2. The motor 25 spins the disc in or above the fluid-filled pan, frothing the solution, creating a high surface area, thin skin of bubbles which remove contaminants from the disc as they move outwards due to centrifugal force. As the disc continues to spin, fluid is removed from the pan and disc, and air contact and centrifugal force eventually dries the disc.

A preferred embodiment provides lowering of the cover and attached disc onto the pan with the disc positioned horizontally above the fluid in the pan. Spinning the disc at high RPMs creates a vacuum underneath which draws the fluid from the pan into contact with the disc. The spinning motion froths the fluid and cleans the disc. Lowering the RPMs of the motor allows the fluid level to drop, and continued spinning dries the disc through air contact and centrifugal force. The same vacuum which draws the fluid level in contact with the disc may also be used to draw fluid from the reservoir onto the spin pan.

A reverse mode may be provided in the motor to be engaged during the spin cycle. Reversing direction of the spinning CD can add to the movement of the fluid, disengage the fluid in contact with the CD because of the vacuum, or assist in drying of the CD.

Figure 3:
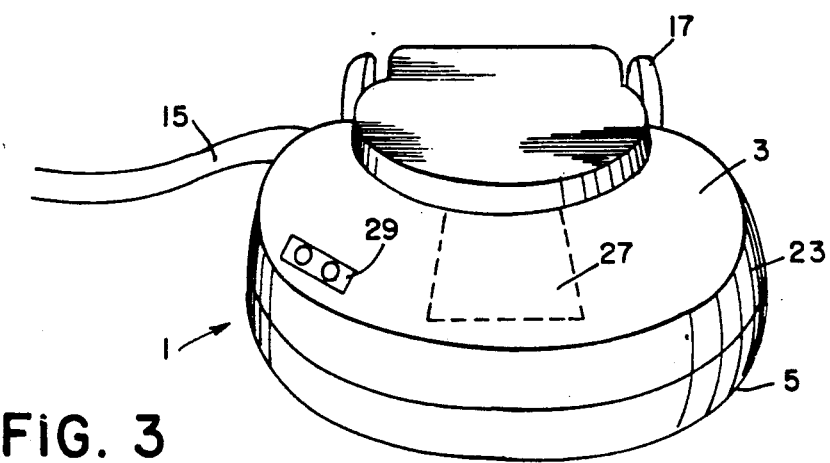
FIG. 3 is a top perspective showing the exterior of the cleaner.

FIG. 3 shows a preferred exterior of the present invention. The cover 3 mates with base 5, which incorporates a splash guard 23. The splash guard can be constructed of a clear material or formed with the base. A window 27 can be incorporated in the cover 3. On/off switches or buttons 29 can be provided for selectively turning the washer on or off.

In an alternative embodiment, the motor automatically runs a cycle when the lid is closed. With the CD nesting in the pan, the motor begins spinning with the CD in or above the solution. Initial spinning causes frothing of the solution to wash the CD while continued spinning forces liquid off of the CD onto the splash guard. In a preferred embodiment, a variable motor provides an initial frothing or washing cycle with set RPMs and a drying cycle with different RPMs. In the automatic mode, the cover is closed, the CD spins at a given RPM to wash, and then changes RPMs to dry with the cycle ending after a given time in the dry cycle. The user then opens the cover and removes the washed CD. Using the on/off button 29, the user would shut the cover and turn the cleaner on, looking through the window 27 to see when the CD is dry.

The motor can be powered through an electrical connection or outlet wire 15. Alternatively, a battery pack (not shown) can be provided for increased portability.

Figure 4:
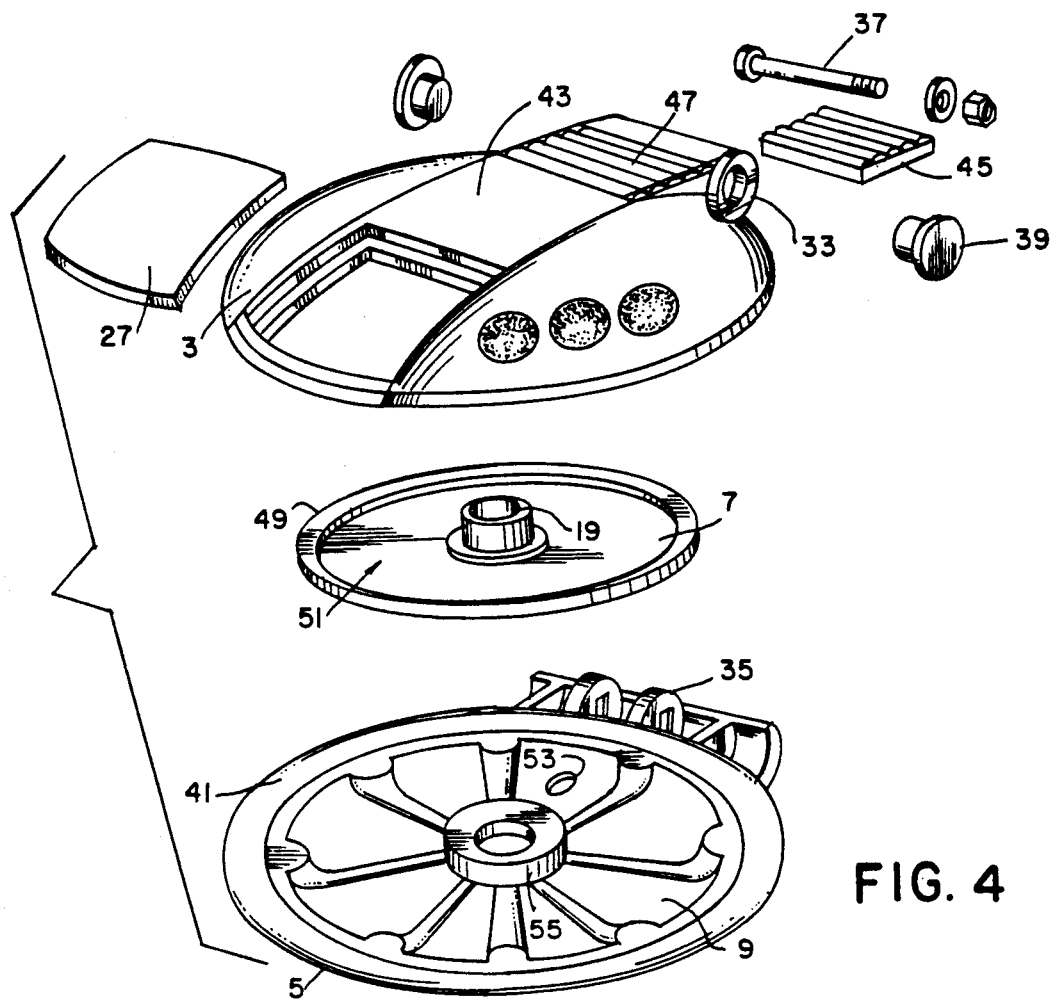
FIG. 4 is an elevated perspective showing assembly of the base, reservoir, pan, cover and exterior cover components.

A preferred assembly is shown in FIG. 4. The base 5 incorporates a pump 55 attached to a power supply through an aperture 53. The aperture may be in the base as shown in FIG. 4, or in another suitable place, and the motor and pump can be powered by a single power supply. The pan 7 preferably is positioned above the reservoir 9 with fluid communicable through the port. In FIG. 1, the pan 7 has a spin well 51, with an outer flange 49 for holding fluid while the disc is being washed. The center well 19 is provided for keeping fluid from re-entering the port.

The hinge mechanism can be of any suitable configuration, but a preferred mechanism is shown in FIG. 4. A bolt 37 threads through the cover hinge 33 and base hinge 35. Ornamental protectors 39 cover the outer ends of the bolt 37. A wiping pad 43 can be provided on the exterior of the cleaner and is preferably formed of a soft, non-abrasive material such as chamois. The pad allows for drying of any excess fluid which may have been left on the disc after spinning. A compartment 47 may be incorporated on the cover or on the base for insertion of a battery pack 45, or alternatively, a container of concentrated solution for addition to water to form the cleaning solution.

A rubber gasket 41 may be provided between the cover and the base to prevent any fluid from escaping during spin cycles.

Figure 5:
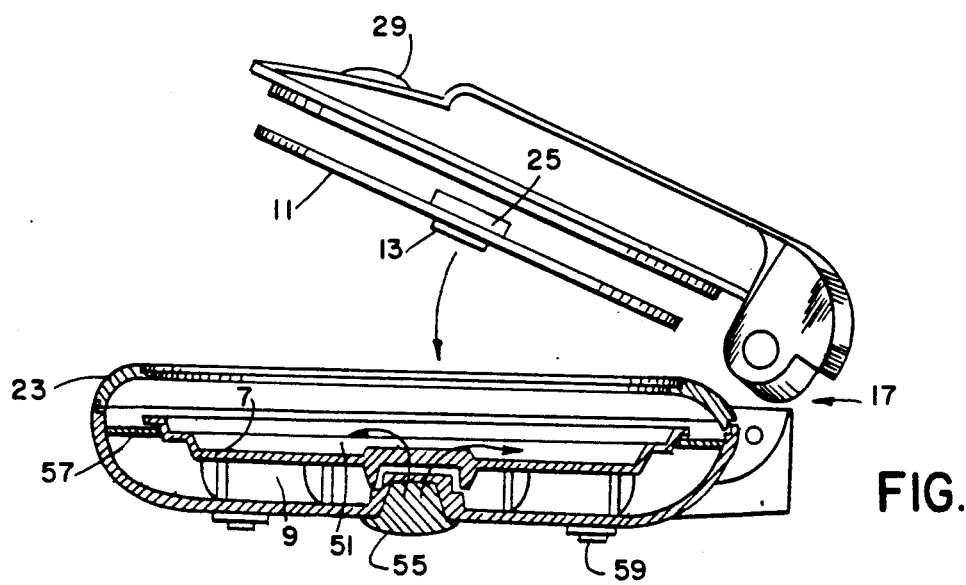
FIG. 5 is a cutaway side view showing pumping of fluid or solution onto the pan and lowering the cover with attached CD onto the pan.

FIG. 5 shows the open cover closing on the base with disc 11 on spindle 13 and solution being pumped into the well 51. Fluid spins off the disc against the splash guard 23. A filter 57 can be provided proximal the splash guard 23 for filtering the solution prior to entry into the reservoir 9. Rubber tipped legs 59 are suitable mounts for the cleaner.

A spindle can be provided extending through the pan with the motor mounted in the base. A hand crank with variable gear arrangements can allow for high RPMs. Motor engagements of various types, and various types of motors do not restrict the scope of the present invention.

While the invention has been described with reference to specific embodiments, modifications and variations of the invention may be constructed without departing from the scope of the invention, which is defined in the following claims.

We claim:

1. A non-abrasive cleaner for discs comprising a spinning means having an engagement means for driving the disc, an enclosure, a spin pan for holding cleaning fluid and contacting the disc with cleaning fluid supplied from a cleaning fluid reservoir, the disc positioned and spinning with respect to the fluid, initially frothing the fluid within the spin pan and subsequently spinning the fluid off the disc to wash and dry the disc without abrasive contact, wherein the pan is positioned horizontally over the reservoir and has a central port for facilitating supplying of fluid from the reservoir to the pan.

2. The apparatus of claim 1, wherein the disc is positioned horizontally with respect to the fluid in the spin pan.

3. The apparatus of claim 1, further comprising the spinning means being a motor connected to a power source.

4. The apparatus of claim 1, further comprising the reservoir and spin pan provided within a base of the enclosure and the spinning means provided within a cover of the enclosure, a hinged connection provided between the base and the cover.

5. The apparatus of claim 4, wherein the motor is mounted in the cover and the engagement means extends towards the base for positioning and spinning the disc with respect to the fluid in the spin pan.

6. The apparatus of claim 1, wherein the engagement means is a spindle for engaging the center hole of a disc.

7. The apparatus of claim 1, further comprising the base incorporating a splash guard proximal the outer edges of the pan for collecting fluid spinning off the disc and pan, and directing the fluid to the reservoir.

8. The apparatus of claim 7, further comprising a filter element provided between the pan and the reservoir so as to filter the fluid prior to entering the reservoir.

9. The apparatus of claim 1, further comprising the cover incorporating a viewing means for viewing the spinning disc.

10. The apparatus of claim 1, further comprising a wiping pad provided on the cover for drying excess fluid left on the disc after spinning.

11. The apparatus of claim 1, further comprising a pump provided for forcing fluid from the reservoir onto the pan.

12. The apparatus of claim 1, further comprising a reverse mode provided within the motor for reversing the spin of a CD.

13. The apparatus of claim 1, further comprising the disc positioned within the pan at least partially submerged within the fluid.

14. The apparatus of claim 1, further comprising the disc positioned within the spin pan above a cleaning fluid level, wherein the disc spins and creates a vacuum underneath which draws the fluid upward in contact with the disc to thereby clean the disc.

15. A non-abrasive cleaner for discs comprising a spinning means having an engagement means for driving the disc, an enclosure, a spin pan for holding cleaning fluid and contacting the disc with cleaning fluid supplied from a cleaning fluid reservoir, the disc positioned and spinning with respect to the fluid, initially frothing the fluid within the spin pan and subsequently spinning the fluid off the disc to wash and dry the disc without abrasive contact, further comprising the motor being a variable speed motor, wherein the cleaner has a wash cycle and a dry cycle, the wash cycle having different RPMs that the dry cycle for frothing and partially submerging the disc in the fluid on the pan, and subsequently spinning the fluid off the disc and the pan due to spin during the dry cycle.

16. A non-abrasive cleaner for discs, comprising a motor having a disc attachment means for centrifugally spinning disc, a base, a cover hinged to the base and further attached to the motor, a spin pan provided within the base for holding cleaning fluids, the disc positioned above the cleaning fluid in the pan and a spinning motion being imparted by the motor, creating a vacuum which draws the cleaning fluid upward from a central port of a reservoir to the pan, into contact with the disc to thereby clean the disc without abrasive contact.

17. A non-abrasive cleaning method for discs comprising supplying cleaning fluid from a reservoir to a spin pan in an enclosure having a spinning means, horizontally positioning and spinning the disc with respect to the fluid, contacting the disc with fluid from a central port of a reservoir to the pan thereby facilitating supplying of fluid from the reservoir to the pan, frothing the fluid with the spinning disc, and subsequently spinning the fluid off the disc to dry the disc through centrifugal force and air contact, thereby washing and drying the disc without abrasive contact.

18. The method of claim 17, wherein the spinning comprises spinning the disc with a motor connected to a power source.

19. The method of claim 17, further comprising providing the cleaning fluid reservoir in communication with the spin pan and communicating fluid from the reservoir to the spin pan.

20. The method of claim 19, further comprising providing the reservoir and spin pan within the base and the spinning means within the cover; hinging the base and the cover, positioning the disc on an engagement means attached to the motor in the cover and closing the cover on the base.

21. The method of claim 17, further comprising providing the enclosure with a base and a cover, positioning the spin pan within the base, and closing the cover on the base prior to spinning the disc with respect to the fluid.

22. The method of claim 17, wherein the disc is positioned approximately horizontally with respect to the fluid.

23. The method of claim 17, further comprising mounting an engagement means on the spinning means and engaging the disc to impel the disc in a spinning motion as imparted by the spinning means.

24. The method of claim 23, wherein the engaging means engages the center hole of a disc.

25. The method of claim 17, further comprising providing a splash guard proximal the outer edges of the pan, collecting fluid spinning off the disc and pan on the guard, and directing the fluid to the reservoir in communication with the pan.

26. The method of claim 25, further comprising providing a filter between the pan and the reservoir so as to filter the fluid after washing the disc and prior to entering the reservoir.

27. The method of claim 17, further comprising incorporating a viewing means on the enclosure for viewing the spinning disc.

28. The method of claim 17, further comprising providing a wiping pad on the enclosure for drying excess fluid left on the disc after spinning.

29. The method of claim 17, further comprising at least partially submerging the disc in the fluid on the pan, spinning the disc and thereby frothing the fluid to create bubbles which wash disc, and subsequently spinning the bubbles off the disc to dry the disc.

30. The method of claim 17, further comprising positioning the disc above the fluid in the spin pan, spinning the disc at rate to create a vacuum between the disc and the fluid to thereby draw the fluid upward into contact with the disc, frothing the fluid with the spinning disc to clean the disc, and drying the disc through continued spinning.

31. A non-abrasive cleaning method for discs comprising supplying cleaning fluid from a reservoir to a spin pan in an enclosure having a spinning means, positioning and spinning the disc with respect to the fluid, contacting the disc with fluid, frothing the fluid with the spinning disc, and subsequently spinning the fluid off the disc to dry the disc through centrifugal force and air contact, thereby washing and drying the disc without abrasive contact, further comprising providing the cleaning fluid reservoir in communication with the spin pan and communicating fluid from the reservoir to the spin pan, further comprising providing the reservoir and spin pan within the base and the spinning means within the cover; hinging the base and the cover, positioning the disc on an engagement means attached to the motor in the cover and closing the cover on the base, further comprising positioning the pan horizontally over the reservoir, incorporating a port in the pan, and supplying fluid from the reservoir to the pan through the port.

* * * * *